United States Patent [19]
Craven

[11] 3,952,821
[45] Apr. 27, 1976

[54] MOTOR DRIVEN GOLF BAG CART

[76] Inventor: Charles G. Craven, 35 Will Drive, Canton, Mass. 02021

[22] Filed: Jan. 22, 1975

[21] Appl. No.: 543,157

[52] U.S. Cl. ............................. 180/19 R; 280/646
[51] Int. Cl.² ........................................ B62D 51/04
[58] Field of Search ............. 180/19 R, 19 H, 19 S, 180/25 A, 1 R; 280/DIG. 5, 36 C, 42

[56] References Cited
UNITED STATES PATENTS

| | | | |
|---|---|---|---|
| 2,648,545 | 8/1953 | Cassidy | 280/42 |
| 2,725,946 | 12/1955 | Welter | 180/19 R |
| 2,975,850 | 3/1961 | Dolphin | 180/1 R |
| 3,232,367 | 2/1966 | York | 180/19 R |
| 3,753,473 | 8/1973 | Hollis | 280/DIG. 5 |

*Primary Examiner*—M. H. Wood, Jr.
*Assistant Examiner*—John A. Pekar

[57] ABSTRACT

A two-wheeled golf bag cart has a support for a battery powered electric motor and it includes a gear box to the input shaft of which the motor is connected and which has axially aligned oppositely disposed output shafts. The wheels of the holder have hubs through which stub shafts extend. An intermediate shaft for each wheel has universal joints, one connecting it to the stub shaft and the other to the appropriate output shaft. The support includes an upright having a handle and a golf bag holder is connected to the support and the upright. Two links are connected to each hub with one link connected to the support and the other a slide slidable lengthwise of the upright. The slide has a lock connecting it to the upright when the linkage is positioned to space the wheels apart but releasable to enable the slide to be moved towards the handle to collapse the cart for storage with the linkage folding to bring the wheels close together and towards the handle.

9 Claims, 10 Drawing Figures

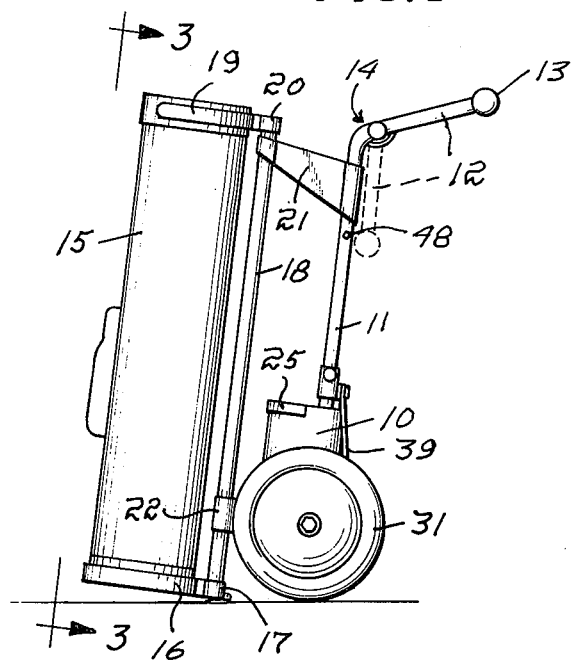
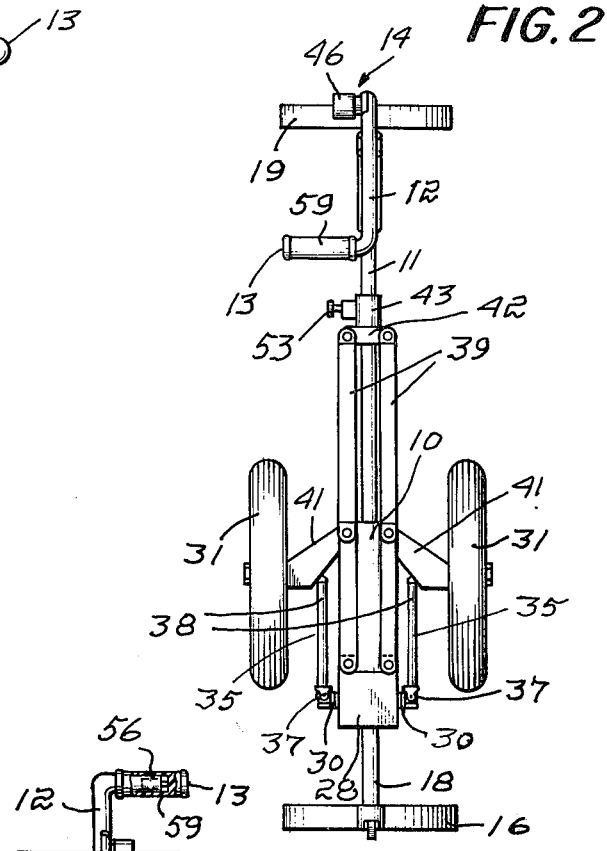
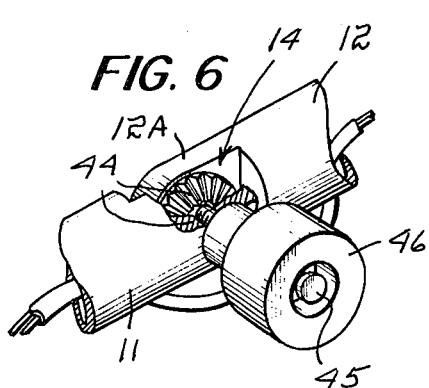
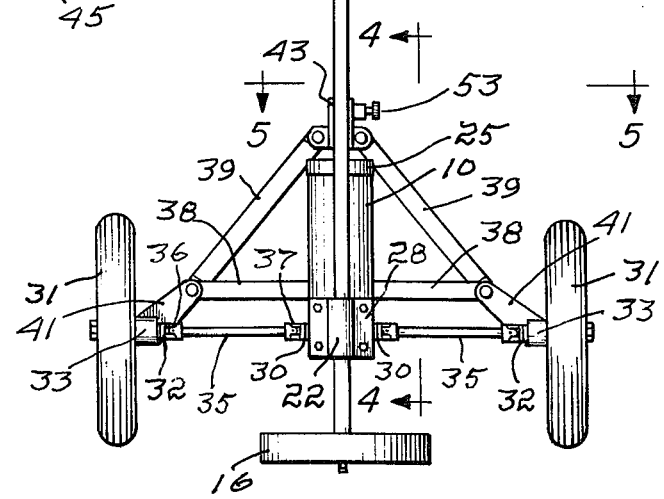

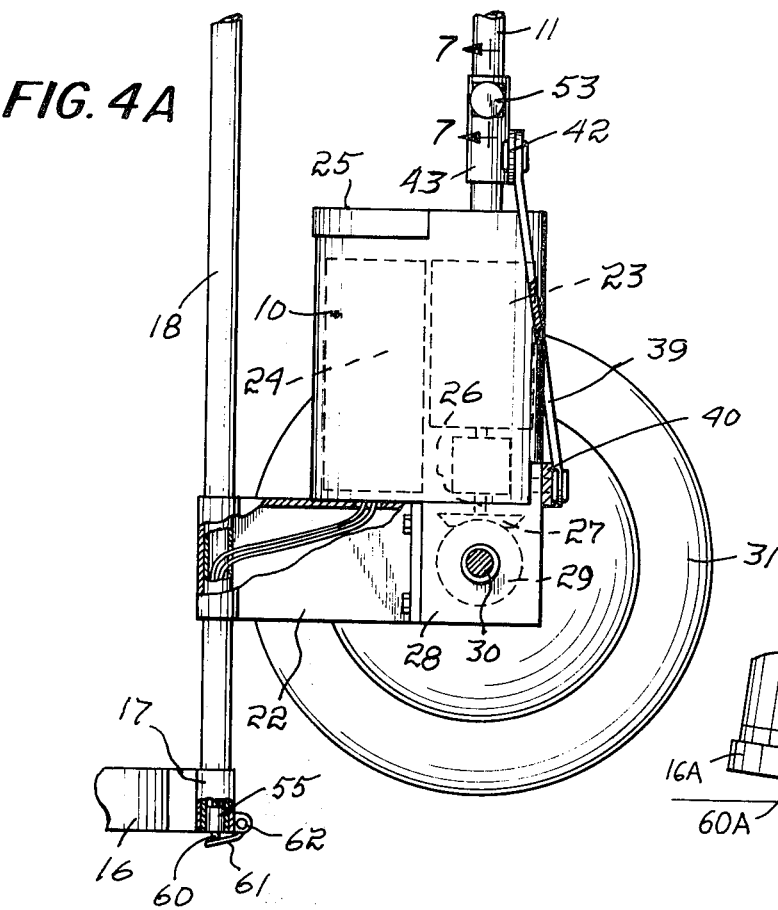
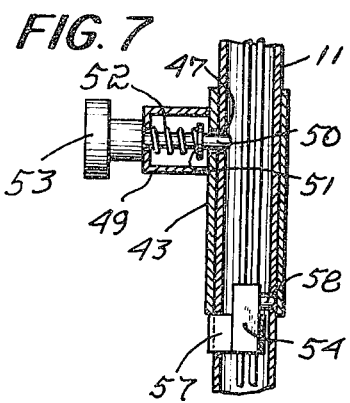
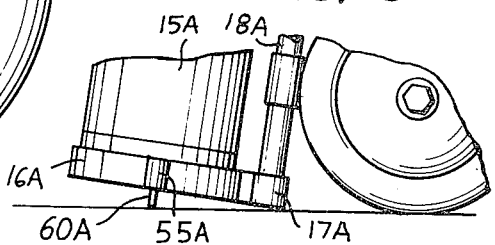
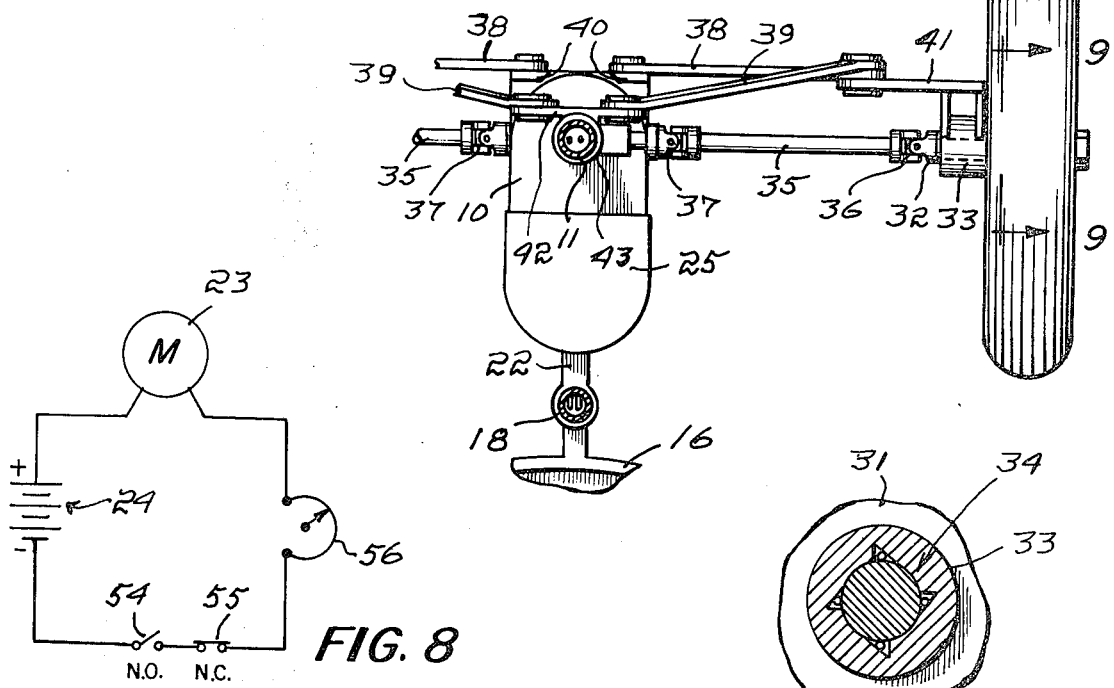
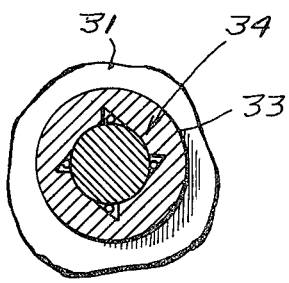

MOTOR DRIVEN GOLF BAG CART

BACKGROUND REFERENCE

U.S. Pat. No. 3,167,146 and U.S. Pat. No. 3,820,617 show motor driven, collapsible golf carts.

BACKGROUND OF THE INVENTION

The use of carts, and particularly those having two wheels, has become common because of the weight of a full set of golf clubs. As the use of such carts still entails enough effort on the part of the user to detract somewhat from his enjoyment of a game, such carts have been motorized as a result of which various problems have arisen, among them making them collapsible so that they may be carried in the trunk of a car, for one example.

THE PRESENT INVENTION

The general objective of the present invention is to provide a motorized, two-wheeled golf bag cart that is better adapted to meet the requirements of manufacture, use and storage than those presently available and of which I am aware.

In accordance with the invention, this general objective is attained by providing a support including an upright having a handle and also having a golf bag holder. The support has a drive including a battery powered motor. A pair of axially aligned shaft portions is provided with at least one shaft portion, and desirably both, a part of the drive. The wheels have hubs through which stub shafts extend and an intermediate shaft is provided for each wheel, each intermediate shaft has universal joints, one connecting it to a shaft portion and the other to the appropriate stub shaft. First and second links are pivotally connected coaxially to each hub and the first links are pivotally connected to the support and the second links are pivotally connected to a slide movable lengthwise of the upright between two positions, a lower operative position in which the wheels are spaced apart for the support of the cart in use with the stub shaft substantially in alignment with the shaft portions and an upper position in which the linkage is folded upwardly close to the upright and the wheels positioned close together providing a collapsed state in which the cart can be conveniently stored in the trunk of an automobile.

Another objective of the invention is to provide a drive for utilizing a speed reduction, an objective attained within the support having a gear box with the ends of its output shaft protruding a short distance from its sides, the shaft ends, the shaft portions.

Another objective is to provide for maximum ease of operation, an objective attained by connecting a forwardly extending arm to the upper end of the upright, the arm having a handle that extends transversely of the cart and including a rotatable handgrip by which a rheostat is adjusted to control the speed of the cart to suit the user but with the connection between the arm and the upright pivotable to enable the arm to be swung downwardly towards the upright when the cart is to be collapsed.

A further objective of the invention is to facilitate the operation of the cart, an objective attained by providing each wheel with a one-way clutch engageable only when the wheels are driven by the motor.

Another objective of the invention is to ensure safety, an objective attained by providing means releasably locking the linkage both when the cart is ready for use and when it is in its collapsed state.

Yet another objective of the invention is to ensure against the motor being operated at the wrong time, an objective attained by providing the motor circuit with a normally open switch that is closed only when the linkage is locked in position readying the cart for use and a further objective is to prevent the operation of the motor when the cart is positioned upright, an objective attained by providing the motor circuit with a normally closed switch that is opened when the base of the bag holder rests on the ground.

BRIEF DESCRIPTION OF THE DRAWINGS

In the accompanying drawings, there is shown a motor driven golf bag cart in accordance with a preferred embodiment of the invention and FIG. 1 is a side view of the cart with a golf bag secured thereto;

FIG. 2 is a view, on an increase in scale, as seen from the handle end of the cart with the cart collapsed for storage;

FIG. 3 is a view, on the scale of FIG. 2, taken approximately along the indicated line 3—3 of FIG. 1 but with the golf bag removed;

FIG. 4 is a section taken approximately along the indicated lines 4—4 of FIG. 3;

FIG. 5 is a section taken approximately along the indicated lines 5—5 of FIG. 3;

FIG. 6 is a perspective, fragmentary view, on a further increase in scale, showing the connection between the handle and the upright;

FIG. 7 is a fragmentary section taken approximately along the indicated line 7—7 of FIG. 4 showing the lock holding the wheels in their spaced-apart operating positions;

FIG. 8 is a schematic view of the operating circuit;

FIG. 4A is a partly sectioned view of a wheel showing the one-way clutch connecting it to the wheel shaft; and FIG. 9 is a fragmentary view of another embodiment of the invention.

THE PREFERRED EMBODIMENT OF THE INVENTION

The two-wheeled golf bag cart illustrated by the drawings has a housing 10 provided with a tubular upright 11 to the curved upper end of which an arm 12 having a transverse handle 13 is attached by a pivotable connection generally indicated at 14 and shown in detail in FIG. 6.

The holder for a golf bag 15 has a base 16 receiving within it the bottom end of the bag 15 and having a socket 17 fitted on the bottom end of a tubular post 18. A retainer 19, dimensioned partially to encircle the upper end of the bag 15, has a socket 20 fixed on the upper end of the post 18. Brackets 21 and 22, secured to the post 18 are carried, respectively, by the upright 11 and the housing 10 and hold the post 18 parallel to the upright 11.

An electric motor 23 is mounted in the housing 10 which is also dimensioned to receive within it a battery 24. The housing 10 has a cover 25 to be opened when the battery is to be placed therein and connected to the motor 23 or disconnected therefrom and removed. The motor 23 is mounted in the housing 10 with its drive shaft 26 depending and connected to a bevel gear 27 within a gear box 28 having a bevel gear 29 on a transverse drive shaft 30 in mesh with the gear 27. The transverse shaft 30 projects a short distance from both sides of the gear box 28.

Each of the two wheels 31 has a stub shaft 32 extending through a hub 33 and a one-way clutch, generally indicated at 34, see FIG. 4A, operable to connect the wheel 31 to its shaft 32 when the shafts 32 are rotated in a direction to drive the cart forwardly, the direction indicated by the arrow in FIG. 1.

Each stub shaft 32 is connected to the appropriate end of the drive shaft 30 by an intermediate shaft 35 having universal joints 36 and 37, the former connecting the stub shaft 32 thereto and the latter connecting the intermediate shaft 35 to the drive shaft 30.

The wheels 31 are held in their spaced apart, operative position with the stub, intermediate and drive shafts axially aligned by linkage consisting of a first pair of links 38 and a second pair of links 39. Each of the first links 38 is shown as pivotally connected to the appropriate one of the mounts 40 on the front upper edge of the gear box 28 and to a bracket 41 fixed on the hub 33 of the appropriate wheel 31. Each of the second pair of links 39 is pivotally connected at one end to the appropriate one of the brackets 41 with its pivot axis coaxial with that of the corresponding first link 38 and its other end pivotally connected to the proximate end of a holder 42 carried by a slide 43, shown as a sleeve and slidable along the upright 11 between a first or lower position in which the wheels 31 are in their spaced-apart, operative position and an upper position in which the linkage is folded upwardly close to and substantially parallel to the upright 11, see FIG. 2 and the wheels 31 are spaced close together with their axes intermediate the brackets 21 and 22, the upper position is the "collapsed" or storage position and enables the cart to be easily fitted within the trunk of a passenger automobile.

The pivotable connection 14 enables the arm 12 to be swung downwardly against the upright 11 from its position of use into its inoperative position shown in FIG. 2 when the cart is to be collapsed. Desirably, and as shown in FIG. 6, the upper curved end of the upright 11 has a shoulder 11A offset to complement the offset shoulder 12A of the arm 12 and the proximate faces of the shoulders 11A and 12A are each formed with a circular series of radial teeth 44 that when interengaged to hold the arm 12 in a selected angular relation to the upright 10 and which, when disengaged, permit the arm 12 to be pivoted. A threaded pivot 45 carried by the shoulder 11A extends freely through the shoulder 12A with the two series of teeth concentric relative thereto. A knob 46 threaded on the pivot 45 enables the two series of teeth 44 to be brought into locking engagement or freed to be disengaged.

In order that the slide 43 may be held in either position, the upright 11 has a hole 47 adjacent the housing 10 and a hole 48 adjacent the bracket 21, see FIGS. 1 and 7 and the slide 43 is provided with a mount 49 slidably supporting a locking pin 50 having a flange 51 within the mount engaged by a spring 52 backed by the outer wall of the mount and yieldably urging the pin 50 against the upright 11 and into whichever one of the holes 47 and 48 it is brought into registry. A knob 53, on the exposed outer end of the pin 50 enables it to be easily withdrawn whenever the slide 43 is to be released from one locked position to slide into its other position.

The motor circuit, shown schematically in FIG. 8, includes a normally open safety switch 54, a normally closed safety switch 55, and a rheostat 56 which enables the speed at which the cart is driven by the motor 23 to be adjusted to suit the user or the circuit to be opened.

The normally open switch 54 is supported within the upright 11 by a bracket 57, which also serves as a stop establishing the lower position of the slide 43, with its switch-closing button 58 in a position to be engaged by the sleeve 43 when the pin 50 extends through the lower hole 47 as it does when the cart is ready for use thus making the operation of the motor 23 inoperable unless the linkage is locked to hold the wheels 31 in their spaced-apart, operative relationship.

The rheostat 56 is within the handle 13 and is adjusted by means of the rotatable handgrip 59 and the normally closed switch 55 is mounted within the lower end of the post 18, see FIG. 4, with its actuator 60 exposed for engagement with an underlying plate 61 and connected to the post 18 by a spring hinge 62. When the cart is in use with the handle 13 gripped by the user, the upright 11 is tilted forwardly with the bottom of the post 18 spaced from the ground. When, however, the user releases his hold on the handgrip, the cart is in its upright position illustrated by FIG. 1 with the plate 61, forced by its contact with the ground, to hold the actuator 60 in a position in which the switch 55 is open, thus preventing the operation of the motor 23 if the handgrip 59 is left in an "on" position.

It will be noted that the fact that the upright 11, the arm 12, the handle 13 and the post 18 are tubular not only contribute to a cart construction of minimum weight but also enables the circuit leads to be contained therein. As may be seen in FIG. 4, the bracket 22 is U-shaped in cross section and thus serves to house the leads to and from the normally closed safety switch 55.

In FIG. 9, the normally closed safety switch is shown in a different location and corresponding parts are identified by the suffix addition A to the appropriate reference numeral. The switch 55A, being attached to the base 16A of the golf bag holder in a position remote from the post 18A is less likely to be accidentally actuated than the switch 55 and the FIG. 9B location is, accordingly, preferred.

In the use of a golf bag cart in accordance with the invention and assuming it to be in its collapsed state, it is only necessary to release the locking slide 43 from its upper position and with the base 16 resting on the ground, the wheels 31 drop and the user then exerts an upward pull on the upright 11 until the locking sleeve reaches its bottom position and becomes locked to the upright. With the handle 13 set and locked in a position of use and with the golf bag 15 attached to the cart, the user tilts the cart forwardly and turns the handgrip 59 to complete the motor circuit and provide the desired cart speed with the cart trailing behind the user. The use of one-way clutches 34 makes cart turning or reversal easy in spite of both wheels 31 being positively driven. When the cart is to be collapsed, the golf bag 15 may be removed or it may be left attached. The slide 43 is unlocked and pulled upwardly and when locked in its upper position and the handle 13 folded downwardly, the cart requires minimum space for storage.

I claim:

1. A golf bag cart including a support, an upright attached to said support and including a handle, a bag holder attached to said support and said upright, a drive mounted on said support and including a battery powered electric motor, a pair of coaxial shaft portions at least one of which is part of said drive, a pair of wheels, each including a hub and a stub shaft extending therethrough, an intermediate shaft for each wheel and including universal joints, one connected to the appropriate shaft portion and one connected to the appropriate stub shaft, first and second links for each wheel and pivotally connected thereto with their pivot axes coaxial, the first links pivotally connected to the support, a slide on said upright, the second links pivotally connected to said slide, and means releasably locking said slide to said upright in a first position in which said wheels are spaced apart with said stub and shaft portions substantially coaxial, said locking means, when released, permitting said slide to be moved towards said handle into a second position in which said links are folded upwardly close to the upright and substantially parallel and with said wheels spaced substantially closer together.

2. The golf bag cart of claim 1 in which the support includes a gear box the input shaft of which is connected to the motor and the output shaft includes both of said coaxial shaft portions.

3. The golf bag cart of claim 1 in which the motor circuit includes a normally open switch and the means releasably locking the slide to the upright is operable to close said switch only when in said first position.

4. The golf bag cart of claim 3 in which the releasable locking means is also operable to lock the slide to the upright when in its second position.

5. The golf bag cart of claim 1 in which the upright is tubular and has vertically spaced holes, the means releasably locking the slide to the upright includes a locking pin and a spring yieldably urging said pin into contact with the slide thus to enter one of said holes when aligned therewith and the motor circuit includes a normally open switch within the upright with its actuator positioned to be engaged and operated by the locking pin when it enters the lower hole.

6. The golf bag cart of claim 1 in which the bag holder includes a post attached to the support and the upright and a base dimensioned to receive the lower end of a golf bag and, at least when a golf bag is carried by the holder, the cart has a stable upright position with the base of the holder resting on the ground, and the motor circuit includes a normally closed switch carried by the bag holder with its actuator downwardly disposed to be moved into its switch-opening position when the base of the holder rests on the ground.

7. The golf bag cart of claim 6 in which the normally closed switch is attached to the base of the golf bag holder.

8. The golf bag cart of claim 6 in which the normally closed switch is attached to the lower end of the post of the golf bag holder.

9. The golf bag cart of claim 1 in which the handle includes a pivotable connection with the upper end of the upright and extends forwardly relative thereto, means to lock said arm in an operative position and releasable to permit said handle to swing downwardly into a position close to the upright, the handle and upright are tubular, the motor circuit extends therethrough and includes a rheostat within the handle, and the handle includes a rotatable handgrip connected to the rheostat to adjust it.

* * * * *